US011927498B2

United States Patent
Bertone et al.

(10) Patent No.: US 11,927,498 B2
(45) Date of Patent: Mar. 12, 2024

(54) ADIABATIC REDUCING PRESSURE TRANSDUCER, SYSTEM AND METHOD

(71) Applicant: Waters Technologies Corporation, Milford, MA (US)

(72) Inventors: Gary W. Bertone, Southborough, MA (US); Taylor J. Castagna, Boston, MA (US); Robert J. Dumas, Upton, MA (US)

(73) Assignee: Waters Technologies Corporation, Milford, MA (US)

( * ) Notice: Subject to any disclaimer, the term of this patent is extended or adjusted under 35 U.S.C. 154(b) by 0 days.

(21) Appl. No.: 17/521,986

(22) Filed: Nov. 9, 2021

(65) Prior Publication Data
US 2022/0065721 A1     Mar. 3, 2022

Related U.S. Application Data

(63) Continuation of application No. 16/420,845, filed on May 23, 2019, now Pat. No. 11,204,293.
(Continued)

(51) Int. Cl.
*G01L 9/04*     (2006.01)
*G01L 9/00*     (2006.01)
(Continued)

(52) U.S. Cl.
CPC .............. *G01L 9/04* (2013.01); *G01L 9/0051* (2013.01); *G01L 19/04* (2013.01); *G01N 30/32* (2013.01); *G01N 30/64* (2013.01)

(58) Field of Classification Search
CPC ..... G01L 19/147; G01L 9/0042; G01L 19/04; G01L 9/0054; G01L 9/0072;
(Continued)

(56) References Cited

U.S. PATENT DOCUMENTS

| 4,574,640 A | 3/1986 | Krechmery |
| 6,928,878 B1 | 8/2005 | Eriksen et al. |

(Continued)

FOREIGN PATENT DOCUMENTS

| CN | 1049718 A | 3/1991 |
| CN | 102265121 A | 11/2011 |
| CN | 106248290 A | 12/2016 |

OTHER PUBLICATIONS

Examination Report in European Patent Application No. 19732157.3 dated Sep. 22, 2022.
(Continued)

*Primary Examiner* — Andre J Allen
(74) *Attorney, Agent, or Firm* — Schmeiser, Olsen & Watts LLP; Victor J. Baranowski

(57) ABSTRACT

Disclosed is a pressure transducer including a body made of a material having a first coefficient of thermal expansion, a fluidic inlet and a fluidic cavity enclosed by the body in fluidic communication with the fluidic inlet. The pressure transducer further includes a strain gauge including a resistive element in operable contact with the body. At least a portion of the resistive element made of a material having a second coefficient of thermal expansion that is different from the first coefficient of thermal expansion of the body. Disclosed further is a pressure transducer including a filler body located in a fluidic cavity of the pressure transducer configured to reduce adiabatic thermal effects on a transducer body. Disclosed are systems and methods incorporating the pressure transducers described herein.

20 Claims, 13 Drawing Sheets

Related U.S. Application Data

(60) Provisional application No. 62/675,849, filed on May 24, 2018.

(51) Int. Cl.
  *G01L 19/04* (2006.01)
  *G01N 30/32* (2006.01)
  *G01N 30/64* (2006.01)

(58) Field of Classification Search
  CPC ... G01L 13/025; G01L 19/14; G01L 19/0038; G01L 19/0084; G01L 9/0055; G01L 9/0075; G01L 19/0069; G01L 9/0052; G01L 9/0073; G01L 19/0092; G01L 19/0618; G01L 19/0645; G01L 19/143; G01L 9/0051; G01L 19/0007; G01L 19/0046; G01L 19/06; G01L 19/0627; G01L 19/0681; G01L 27/002; G01L 9/00; G01L 9/0041; G01L 9/0044; G01L 11/025; G01L 11/04; G01L 19/0023; G01L 19/0672; G01L 19/069; G01L 19/142; G01L 19/145; G01L 19/16; G01L 7/00; G01L 9/0047; G01L 9/06; G01L 9/065; G01L 9/12; G01L 11/02; G01L 13/00; G01L 15/00; G01L 19/0015; G01L 19/003; G01L 19/02; G01L 19/0609; G01L 19/083; G01L 19/10; G01L 19/148; G01L 27/005; G01L 7/08; G01L 7/082; G01L 7/163; G01L 7/166; G01L 9/0045; G01L 9/0048; G01L 9/006; G01L 9/007; G01L 9/0076; G01L 9/04; G01L 9/045; G01L 9/125; G01L 11/00; G01L 17/00; G01L 19/00; G01L 19/0076; G01L 19/08; G01L 19/141; G01L 19/146; G01L 1/142; G01L 1/2262; G01L 1/246; G01L 21/12; G01L 23/16; G01L 27/007; G01L 7/04; G01L 7/063; G01L 7/084; G01L 7/086; G01L 7/16; G01L 9/0002; G01L 9/0007; G01L 9/0016; G01L 9/0019; G01L 9/0022; G01L 9/0027; G01L 9/0033; G01L 9/0039; G01L 9/005; G01L 9/0058; G01L 9/0077; G01L 9/0079; G01L 9/008; G01L 9/0092; G01L 9/0095; G01L 9/025; G01L 9/08; G01L 9/085; G01L 9/105; G01L 9/14; G01L 9/16
  USPC .................................................. 73/700–756
  See application file for complete search history.

(56) References Cited

U.S. PATENT DOCUMENTS

| | | | |
|---|---|---|---|
| 7,775,119 | B1 | 8/2010 | Suminto et al. |
| 11,204,293 | B2 * | 12/2021 | Bertone ............. G01L 19/0023 |
| 2005/0284228 | A1 | 12/2005 | Toyoda |
| 2015/0128713 | A1 | 5/2015 | Kakoiyama |
| 2015/0362391 | A1 | 12/2015 | Suzuki et al. |
| 2016/0169843 | A1 | 6/2016 | Bunner et al. |

OTHER PUBLICATIONS

International Preliminary Report on Patentability for International Patent Application No. PCT/US2019/033753 dated Dec. 3, 2020.
International Search Report and the Written Opinion for International Patent Application No. PCT/US2019/033753 dated Sep. 13, 2019.
Restriction Requirement in U.S. Appl. No. 16/420,845 dated Mar. 16, 2021.
Non-Final Office Action in U.S. Appl. No. 16/420,845 dated May 20, 2021.
Notice of Allowance in U.S. Appl. No. 16/420,845 dated Aug. 30, 2021.

\* cited by examiner

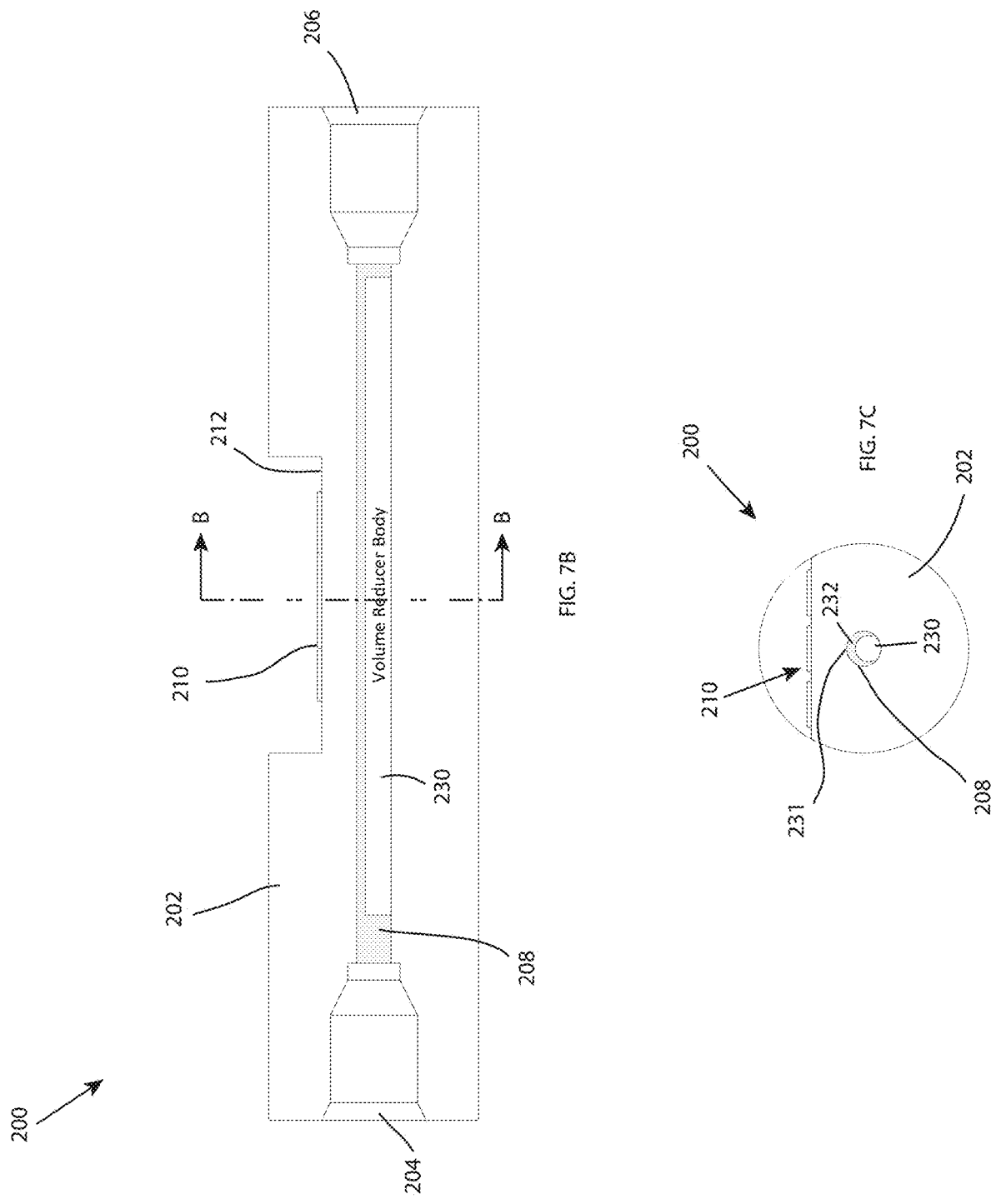

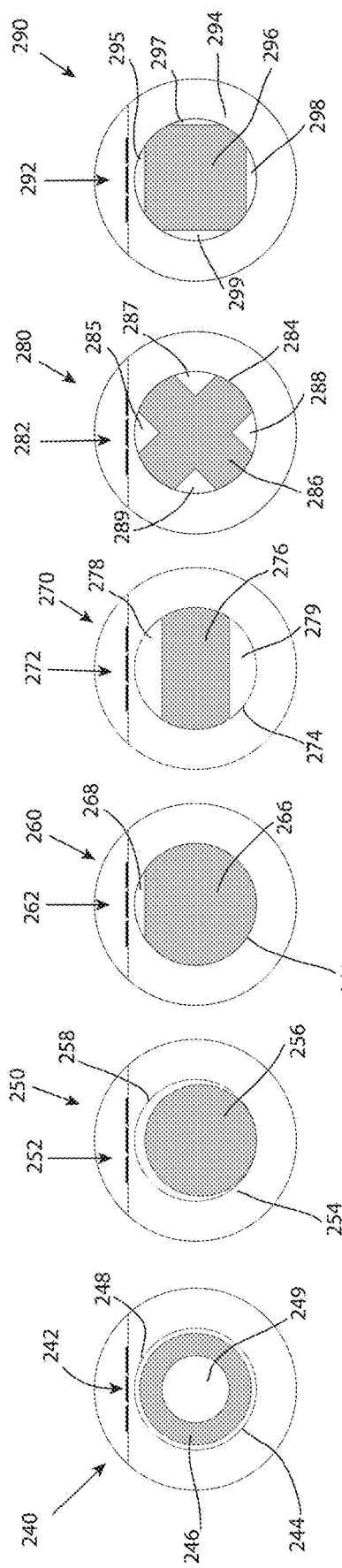

ADIABATIC REDUCING PRESSURE TRANSDUCER, SYSTEM AND METHOD

RELATED APPLICATIONS

This application is a continuation application of U.S. patent application Ser. No. 16/420,845 filed on May 23, 2019, entitled "PRESSURE TRANSDUCER, SYSTEM AND METHOD," which claims priority to U.S. Provisional Patent Application No. 62/675,849, filed May 24, 2018, entitled "PRESSURE TRANSDUCER, SYSTEM AND METHOD," both of which are incorporated herein by reference.

FIELD OF THE INVENTION

The invention relates generally to pressure transducers. More particularly, the invention relates to pressure transducers configured to reduce thermal effects, liquid chromatography systems incorporating pressure transducers, and methods of reducing thermal effects on pressure transducers.

BACKGROUND

A typical strain gage pressure transducer includes a full Wheatstone bridge foil strain gage mounted directly above a pressurized cavity having a suitable web thickness to allow for measurable deflection of intermediate housing material located between the pressurized cavity and the strain gage. The strain gage will typically have two active grids to measure deflection, and two less reactive grids to complete the Wheatstone bridge. To provide an accurate reading, a strain gage must typically be situated in an iso-thermal condition.

However, during periods of rapid compression and decompression, adiabatic heating and cooling of the medium within the pressurized cavity often imparts a thermal disturbance to the housing and onto the strain gage. This thermal disturbance may prevent the pressure transducer from accurately measuring pressure until the thermal disturbance has settled and the four transducer grids have returned to an iso-thermal state. There could be a significant delay in waiting for the grids of the strain gage to return to an iso-thermal state. This delay can be problematic and particularly undesirable in industries, such as high performance liquid chromatography (HPLC), where accurate readings are necessary very quickly after rapid compression and decompression occurs of solvent found in a pressurized cavity. For example, chromatographic solvent pumps operating with pressures larger than 5,000 psi require accurate pressure readings immediately after large pressure changes.

Thus, a strain gage pressure transducer configured to reduce thermal effects, and methods of reducing thermal effects on a strain gage pressure transducer, would be well received in the art.

SUMMARY

In one aspect, the invention features a pressure transducer that includes a body made of a material having a first coefficient of thermal expansion; a fluidic inlet; a fluidic cavity enclosed by the body in fluidic communication with the fluidic inlet; and a strain gauge including a resistive element in operable contact with the body, at least a portion of the resistive element made of a material having a second coefficient of thermal expansion that is different from the first coefficient of thermal expansion of the body.

Additionally or alternatively, the resistive element further includes: a first resistor in operable contact with the body; a second resistor in operable contact with the body; a third resistor in operable contact with the body; and a fourth resistor in operable contact with the body.

Additionally or alternatively, the first, second, third, and fourth resistors are operably connected to form a Wheatstone bridge, and the first and second resistors are active grids and the third and fourth resistors are balance grids.

Additionally or alternatively, the first, second, third, and fourth resistors are each made of the material having the second coefficient of thermal expansion.

Additionally or alternatively, a difference in the first coefficient of thermal expansion and the second coefficient of thermal expansion is configured to reduce settling time after an adiabatic thermal pulse relative to a second pressure transducer having the same properties as the pressure transducer other than the second pressure transducer having well-matched coefficient of thermal expansions.

Additionally or alternatively, the second coefficient of thermal expansion is greater than the first coefficient of thermal expansion.

Additionally or alternatively, the difference in the first coefficient of thermal expansion and the second coefficient of thermal expansion is configured to compensate for an adiabatic thermal pulse.

Additionally or alternatively, the difference in the first coefficient of thermal expansion and the second coefficient of thermal expansion is large enough that an output voltage disturbance during the adiabatic thermal pulse becomes positive.

Additionally or alternatively, the active grids are positioned proximate the fluidic cavity and wherein the balance grids are positioned distal to the fluidic cavity relative to the active grids.

Additionally or alternatively, the balance grids are positioned in line with the active grids and wherein the balance grids are orthogonally oriented relative to the active grids.

Additionally or alternatively, the first and second resistors are made of the material having the second coefficient of thermal expansions and wherein the third and the fourth resistors are made of the material having a third coefficient of thermal expansion that is different than both the first coefficient of thermal expansion and the second coefficient of thermal expansion.

Additionally or alternatively, the first resistor is directly connected in series to a first active grid of the strain gauge, the second resistors is directly connected in series to a second active grid of the strain gauge, the third resistor is directly connected in series to a first balance grid of the strain gauge, and the fourth resistor is directly connected in series to a second balance grid of the strain gauge.

Additionally or alternatively, the first resistor is connected in parallel to a first active grid of the strain gauge, the second resistors is connected in parallel to a second active grid of the strain gauge, the third resistor is connected in parallel to a first balance grid of the strain gauge, and the fourth resistor is connected in parallel to a second balance grid of the strain gauge.

In another aspect, the invention features a method of detecting pressure that includes providing a first pressure transducer having a body and a resistive element attached to the body; mismatching a first coefficient of thermal expansion of the body to a second coefficient of thermal expansion of the resistive element; and detecting pressure of a fluid system with the first pressure transducer.

Additionally or alternatively, the detecting pressure further comprises detecting pressure with the first pressure transducer during an adiabatic thermal pulse.

Additionally or alternatively, the method includes reducing settling time after the adiabatic thermal pulse relative to a second pressure transducer having the same properties as the first pressure transducer other than the second pressure transducer having well-matched coefficient of thermal expansions.

Additionally or alternatively, the second coefficient of thermal expansion is greater than the first coefficient of thermal expansion.

Additionally or alternatively, the method includes outputting a positive output voltage during an adiabatic thermal pulse.

Additionally or alternatively, the method includes compensating, with the mismatched first and second coefficient thermal expansions, for an adiabatic thermal pulse.

In another aspect, the invention features a liquid chromatography system that comprises: a solvent delivery system; a sample delivery system in fluidic communication with solvent delivery system; a liquid chromatography column located downstream from the solvent delivery system and the sample delivery system; a detector located downstream from the liquid chromatography column; and a pressure transducer configured to detect a fluid pressure at a location in the liquid chromatography system, the pressure transducer comprising: a body made of a material having a first coefficient of thermal expansion; a fluidic inlet; a fluidic cavity enclosed by the body in fluidic communication with the fluidic inlet; and a strain gauge including a resistive element in operable contact with the body, at least a portion of the resistive element made of a material having a second coefficient of thermal expansion that is different from the first coefficient of thermal expansion of the body.

In another aspect, a pressure transducer comprises: a transducer body having a fluidic inlet, and a fluidic cavity in fluidic communication with the fluidic inlet and enclosed by the transducer body; a strain gauge attached to the transducer body; and a filler body located in the fluidic cavity configured to reduce adiabatic thermal effects on the transducer body.

Additionally or alternatively, the filler body reduces the cross sectional area of the fluidic cavity to a reduced cross sectional area that is greater than or equal to an inlet cross sectional area at the fluidic inlet.

Additionally or alternatively, the filler body comprises the same material as the transducer body.

Additionally or alternatively, the filler body comprises a material that is different from a material of the transducer body.

Additionally or alternatively, the pressure transducer is a flow through pressure transducer.

Additionally or alternatively, the filler body is a cylindrical body having a diameter less than a diameter of the fluidic cavity and located in the fluidic cavity distal to the strain gauge.

Additionally or alternatively, the filler body is a tubular body having a diameter less than a diameter of the fluidic cavity and located in the middle of the fluidic cavity.

Additionally or alternatively, the filler body extends a substantial length of the fluidic cavity.

Additionally or alternatively, the pressure transducer is a dead-end pressure transducer.

Additionally or alternatively, the pressure transducer is a diaphragm pressure transducer.

Additionally or alternatively, the filler body does not contact a sensing region of an inner surface of the fluidic cavity, the sensing region located directly below the strain gauge within the filler cavity.

In another aspect, a method comprises: providing a pressure transducer having a fluidic inlet, and a fluidic cavity in fluidic communication with the fluidic inlet and enclosed by the transducer body; attaching a strain gauge to the transducer body; integrating a filler body within the fluidic cavity; and reducing a volume of the fluidic cavity with the filler body.

Additionally or alternatively, the method includes reducing adiabatic thermal effects on the transducer body with the filler body relative to a second pressure transducer having the same properties as the pressure transducer other than the second pressure transducer fabricated without the filler body.

Additionally or alternatively, the pressure transducer is a flow through pressure transducer and wherein the filler body extends along a length of the fluidic cavity having a cavity cross sectional area, the method further comprising: reducing the cavity cross sectional area to a reduced cross sectional area along the length with the filler body, wherein the reduced cross sectional area is greater than or equal to an inlet cross sectional area at the fluidic inlet.

Additionally or alternatively, the integrating the filler body within the fluid cavity further comprises not contacting a sensing region of an inner surface of the fluidic cavity with the filler body, the sensing region located directly below the strain gauge within the filler cavity.

In another aspect, a liquid chromatography system comprises: a solvent delivery system; a sample delivery system in fluidic communication with solvent delivery system; a liquid chromatography column located downstream from the solvent delivery system and the sample delivery system; a detector located downstream from the liquid chromatography column; and a pressure transducer configured to detect a fluid pressure at a location in the liquid chromatography system, the pressure transducer comprising: a transducer body having a fluidic inlet, and a fluidic cavity in fluidic communication with the fluidic inlet and enclosed by the transducer body; a strain gauge attached to the transducer body; and a filler body located in the fluidic cavity configured to reduce adiabatic thermal effects on the transducer body.

Additionally or alternatively, the filler body reduces the cross sectional area of the fluidic cavity to a reduced cross sectional area that is greater than or equal to an inlet cross sectional area at the fluidic inlet.

Additionally or alternatively, the filler body comprises the same material as the transducer body.

Additionally or alternatively, the filler body comprises a material that is different from a material of the transducer body.

Additionally or alternatively, the pressure transducer is a flow through pressure transducer.

Additionally or alternatively, the filler body is a cylindrical body having a diameter less than a diameter of the fluidic cavity and located in the fluidic cavity distal to the strain gauge.

Additionally or alternatively, the filler body is a tubular body having a diameter less than a diameter of the fluidic cavity and located in the middle of the fluidic cavity.

Additionally or alternatively, the filler body extends a substantial length of the fluidic cavity.

Additionally or alternatively, the pressure transducer is a dead-end pressure transducer.

Additionally or alternatively, the pressure transducer is a diaphragm pressure transducer.

Additionally or alternatively, the filler body does not contact a sensing region of an inner surface of the fluidic cavity, the sensing region located directly below the strain gauge within the filler cavity.

BRIEF DESCRIPTION OF THE DRAWINGS

The above and further advantages of this invention may be better understood by referring to the following description in conjunction with the accompanying drawings, in which like reference numerals indicate like elements and features in the various figures. For clarity, not every element may be labeled in every figure. The drawings are not necessarily to scale, emphasis instead being placed upon illustrating the principles of the invention.

FIG. 7B depicts a side view of the pressure transducer of FIG. 7A in accordance with one embodiment.

FIG. 7C depicts a cross sectional view of the pressure transducer of FIGS. 7A and 1B taken at arrows B-B in accordance with one embodiment.

FIG. 8A depicts a cross sectional view of a pressure transducer in accordance with one embodiment.

FIG. 8B depicts a cross sectional view of a pressure transducer in accordance with one embodiment.

FIG. 8C depicts a cross sectional view of a pressure transducer in accordance with one embodiment.

FIG. 8D depicts a cross sectional view of a pressure transducer in accordance with one embodiment.

FIG. 8E depicts a cross sectional view of a pressure transducer in accordance with one embodiment.

FIG. 8F depicts a cross sectional view of a pressure transducer in accordance with one embodiment.

DETAILED DESCRIPTION

Reference in the specification to "one embodiment" or "an embodiment" means that a particular, feature, structure or characteristic described in connection with the embodiment is included in at least one embodiment of the teaching. References to a particular embodiment within the specification do not necessarily all refer to the same embodiment.

The present teaching will now be described in more detail with reference to exemplary embodiments thereof as shown in the accompanying drawings. While the present teaching is described in conjunction with various embodiments and examples, it is not intended that the present teaching be limited to such embodiments. On the contrary, the present teaching encompasses various alternatives, modifications and equivalents, as will be appreciated by those of skill in the art. Those of ordinary skill having access to the teaching herein will recognize additional implementations, modifications and embodiments, as well as other fields of use, which are within the scope of the present disclosure as described herein.

Figure 1A:
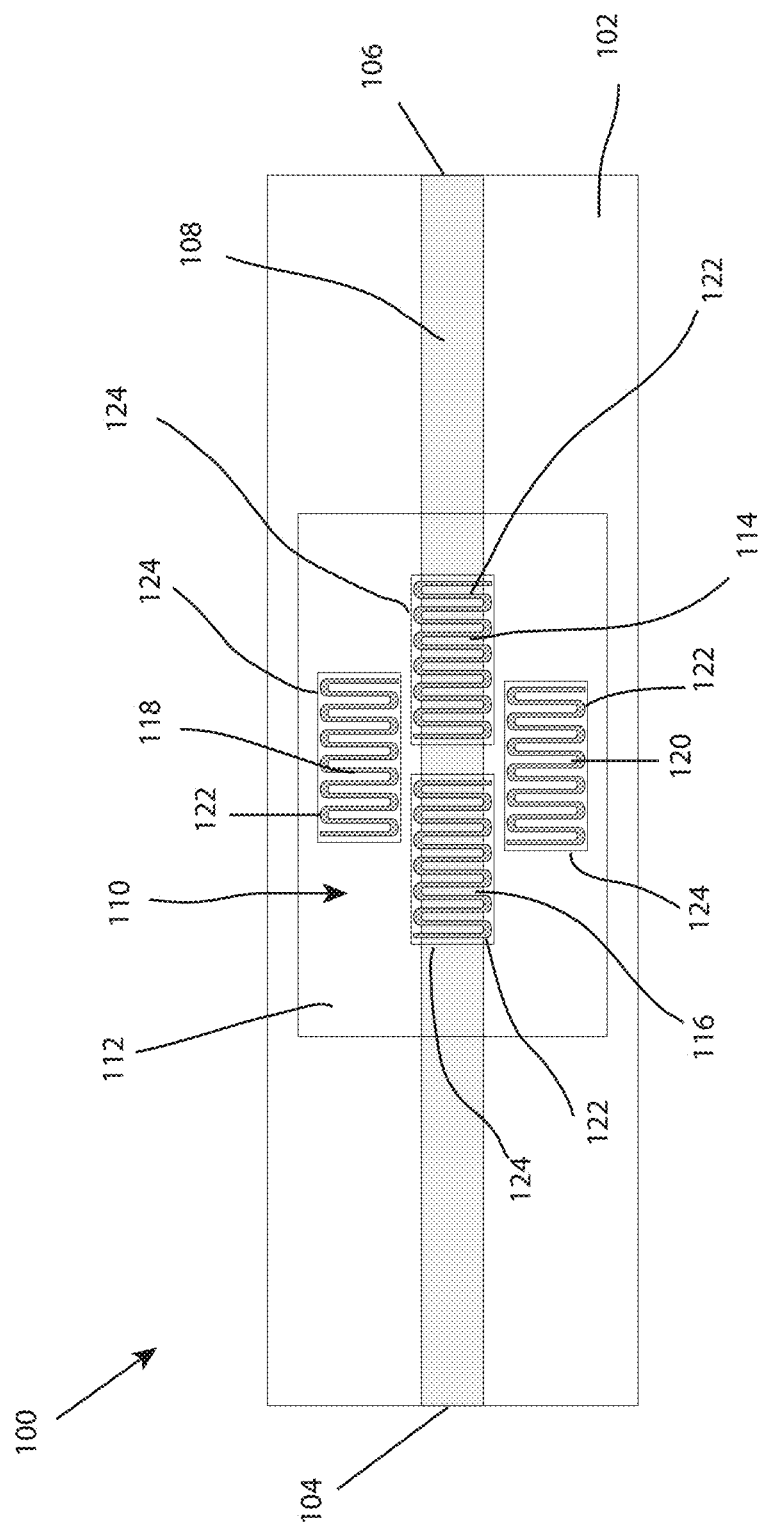
FIG. 1A depicts a top view of an in-line pressure transducer in accordance with one embodiment.
Figure 1B:
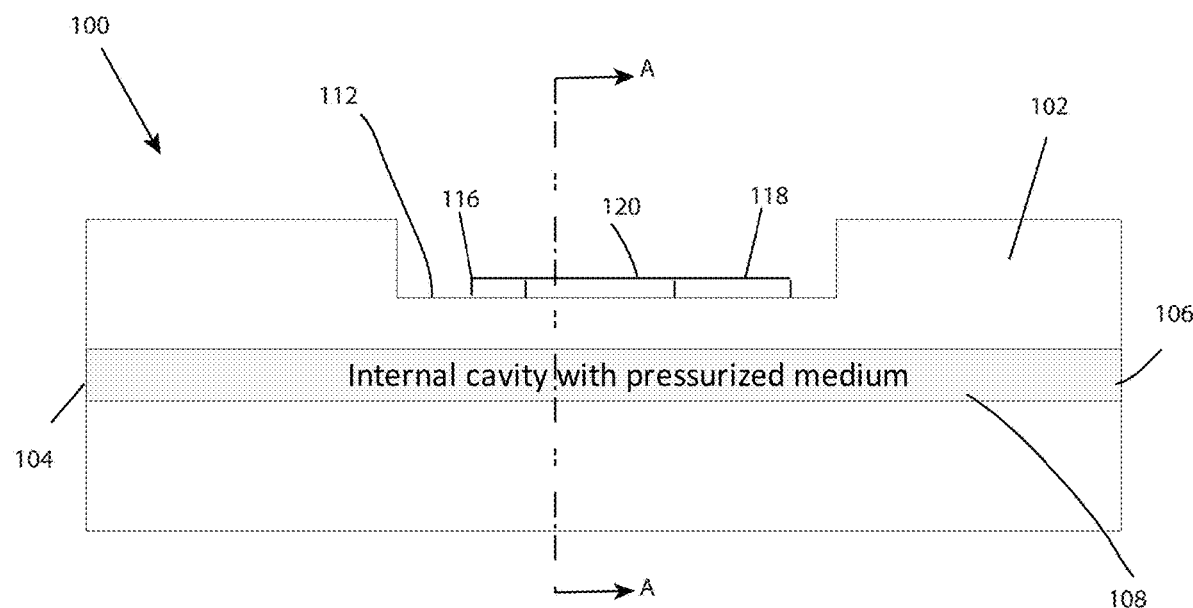
FIG. 1B depicts a side view of the pressure transducer of FIG. 1A in accordance with one embodiment.
Figure 1C:
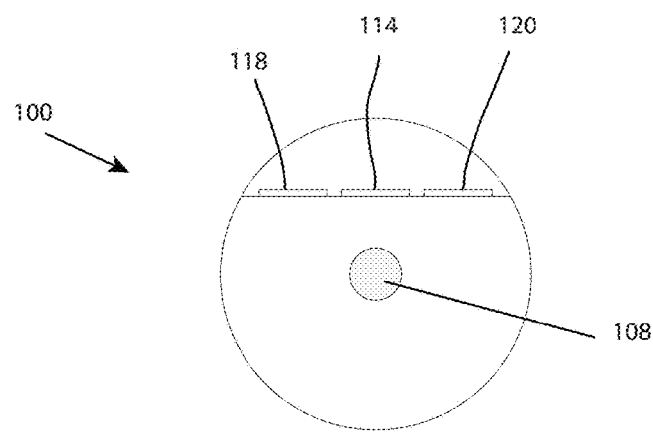
FIG. 1C depicts a cross sectional view of the pressure transducer of FIGS. 1A and 1B taken at arrows A-A in accordance with one embodiment.

Referring to FIG. 1A, a top view of an in-line pressure transducer 100 is shown. Similarly, FIG. 1B shows a side view of the pressure transducer 100 and FIG. 1C shows a cross sectional view of the pressure transducer 100 taken at arrows A-A. The pressure transducer 100 includes a body 102, a fluidic inlet 104, a fluidic outlet 106, and a fluidic cavity 108 extending between the fluidic inlet 104 and the fluidic outlet 106. The fluidic cavity 108 is enclosed by the body 102. While the embodiment shown includes both the fluidic inlet 104 and the fluidic outlet 106, other embodiments contemplated include single ended transducers including a single fluidic inlet that acts as both a fluidic inlet and a fluidic outlet. In this embodiment, the single fluidic inlet may be considered a fluidic interface port.

A strain gauge 110 is disposed on a surface 112 located on the outside of the body 102. The surface 112 may be a flat surface as shown. In other embodiments, the surface 112 may include one or more curves thereon. The strain gauge 110 includes a Wheatstone bridge having a first active grid 114 and a second active grid 116 located directly above the fluidic cavity 108 on the surface 112, along with a first balance grid 118 disposed above the fluidic cavity 108 on the surface 112 and a second balance grid 120 disposed below the fluidic cavity 108 on the surface 112.

The active grids 114, 116 and the balance grids 118, 120 may each include one or more resistive elements 122 or resistors patterned onto a thin carrier backing 124 attached directly to the surface 112. The thin carrier backing 124 may include an adhesive layer configured to attach the grids 114, 116, 118, 120 to the surface 112. The resistive elements 122 may each be thin metallic wires of foil having a particular electrical resistance that changes with the strain on the resistive elements 122. The resistive elements 122 may each be in operable contact with the body 102 through the thin carrier backing 124. "Operable contact" herein shall mean a state where the strain experienced by the body 102 is transferred to the resistive elements 122 to change the electrical resistance of the resistive elements 122. In other words, the thin carrier backing 124 may be located between the resistive elements 122 and the body 102 despite the resistive elements 122 being operably contacting the body 102 for the purposes of measuring strain.

The body 102 may be made of a material having a first coefficient of thermal expansion. For example, the body 102 may be made from titanium, for example, and may include a coefficient of thermal expansion at or around $10.8 \times 10^{-6}$. In other embodiments, the body 102 may be made from steel or stainless steel having a coefficient of thermal expansion between around 17 and $18 \times 10^{-6}$. In still other embodiments, the body 102 may be made of any metallic material having a coefficient of thermal expansion between $10\text{-}12 \times 10^{-6}$. The body 102 may further be made of metals having coefficients of thermal expansion as high as $40 \times 10^{-6}$ (for zinc, for example) and as low as $2 \times 10^{-6}$ (for Invar, for example).

The resistive elements 122 may be made of a metallic material having a coefficient of thermal expansion that is different than the coefficient of thermal expansion of the body 102. For example, the resistive elements 122 may be made of aluminum, having a coefficient of thermal expansion at or around $21 \times 10^{-6}$. In other embodiments, the resistive elements 122 may be made of constantan and Karma allows that include, for example, nickel-chromium, having coefficients of thermal expansion between $13\text{-}14 \times 10^{-6}$. In other embodiments, the resistive elements 122 may be made of steel or stainless steel, having a coefficient of thermal expansion between around $17\text{-}18 \times 10^{-6}$. Whatever the embodiment, the resistive elements 122 may include a different coefficient of thermal expansion than the body 102. In other words, the resistive elements 122 may have a mismatched coefficient of thermal expansion relative to the body 102.

In an exemplary embodiment, the body 102 may be made of titanium having a coefficient of thermal expansion of $10.8 \times 10^{-6}$ while the resistive elements 122 may be matched to stainless steel or steel, having a coefficient of thermal expansion between 17 and $18 \times 10^{-6}$. In this exemplary embodiment, the coefficient of thermal expansion of the resistive elements 122 may be higher than that of the body 102. However, other embodiments are contemplated where the coefficient of thermal expansion of the resistive elements 122 may be lower than that of the body 102. Other examples are contemplated, such as both the body 102 and the resistive elements 122 being made of different steels. In still other embodiments, the body 102 may be made of steel and the resistive elements may be matched to aluminum.

The level of mismatch between coefficients of thermal expansion of the body 102 and the resistive elements 122 may be dependent on the thickness of body material between the fluid path 108 or path and the surface 112 upon which the strain gauge 110 is located, or in other words the web thickness. In the case where the body 102 is made of titanium, and the web thickness is 0.025 inches, a mismatch between coefficients of thermal expansion of the body 102 and the resistive elements 122 may be approximately $10 \times 10^{-6}$. In other words, the resistive elements 122 may have coefficients of thermal expansion $10 \times 10^{-6}$ higher than the coefficient of thermal expansion of the body 102. This amount has been found to correct the thermally induced transients of chromatographic solvents, for example, in liquid chromatography systems. Various other degrees of mismatch may correct pressure transducers having various web thicknesses and subject to various forms of adiabatic thermal events.

In other embodiments, only the active grids 114, 116 may have a mismatched coefficient of thermal expansion relative to the body 102, but not the balance grids 118, 120. In other embodiments, the balance grids 118, 120 may include a mismatched coefficient thermal expansion relative to the body 102, but not the active grids 114, 116. In other embodiments, all of the grids 114, 116, 118, 120 include a mismatched coefficient thermal expansion relative to the body 102. In still further embodiments, the body 102 may be made of a first material having a first coefficient of thermal expansion, the active grids 114, 116 may be made of a second material having a second coefficient of thermal expansion, and the balance grids 118, 120 may be made of a third material having a third coefficient of thermal expansion.

The coefficient of thermal expansions of the grids 114, 116, 118, 120 may be mismatched with the coefficient of thermal expansion of the body 102 such that the difference between the coefficients of thermal expansion may be large enough that an output voltage during an adiabatic thermal pulse becomes positive. In other embodiments, the difference between the coefficients of thermal expansion between the grids 114, 116, 118, 120 and the body 102 may be configured to reduce settling time after an adiabatic thermal pulse relative to a second pressure transducer having the same properties as the pressure transducer 100 other than the second pressure transducer having well-matched coefficients of thermal expansion between the grids and the body of the second pressure transducer. For example, configured the difference between the coefficients of thermal expansion between the grids 114, 116, 118, 120 and the body 102 may be configured to reduce settling time by at least 50 percent relative to the second pressure transducer. In other embodiments, the settling time may be reduced by at least 80 by using mismatched coefficients of thermal expansion between the grids and body compared to well-matched coefficients of thermal expansion. In this manner, the difference in the coefficients of thermal expansion in the grids 114, 116, 118, 120 and the body 102 may be configured to compensate for an adiabatic pulse caused by, for example, fast increases or decreases in pressure by actuating a valve or from a pump actuation cycle where fluid is rapidly compressed and decompressed in a liquid chromatography system (such as the system shown in FIG. 11 and described herein below). In other embodiments, it is contemplated that the settling time may intentionally be increased instead of being intentionally reduced through the mismatched coefficients of thermal expansion.

The fluidic cavity 108 may be considered a fluidic path or other fluidic body configured to receive pressurized fluid. The strain gauge 110 may be configured to detect the pressure in the fluidic cavity 108 or cavity by measuring the strain caused by the pressurized fluid on the body 102. The surface 112 may be a removed portion that is removed from the body 102. In other embodiments, the surface 112 may be molded or otherwise integrated into the body 102. As shown in FIGS. 1B and 1C, the surface 112 is located closer to the fluidic cavity 108 than the rest of the outer circumference of the body 102.

In the embodiment shown in FIGS. 1A-1C, the active grids 114, 116 are positioned proximate the fluidic cavity 108, while the balance grids 118, 120 are positioned distal to the fluidic cavity 108 relative to the active grids 114, 116. In other words, the active grids 114, 116 are positioned directly over the fluidic cavity 108 while the balance grids 118, 120 are positioned above and below, respectively, the active grids 114, 116. In other embodiments, shown in FIGS.

2A-2C, the active grids and balance grids may be positioned in line with each other. In this embodiment, the active grids and the balance grids may be oriented orthogonally relative to each other.

Figure 2C:
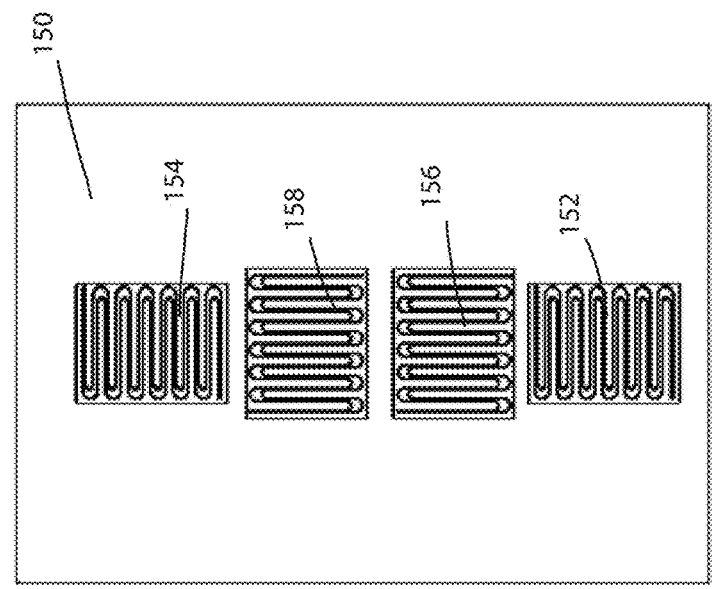
FIG. 2C depicts another strain gauge applicable to a surface of a pressure transducer in accordance with one embodiment.
Figure 2B:
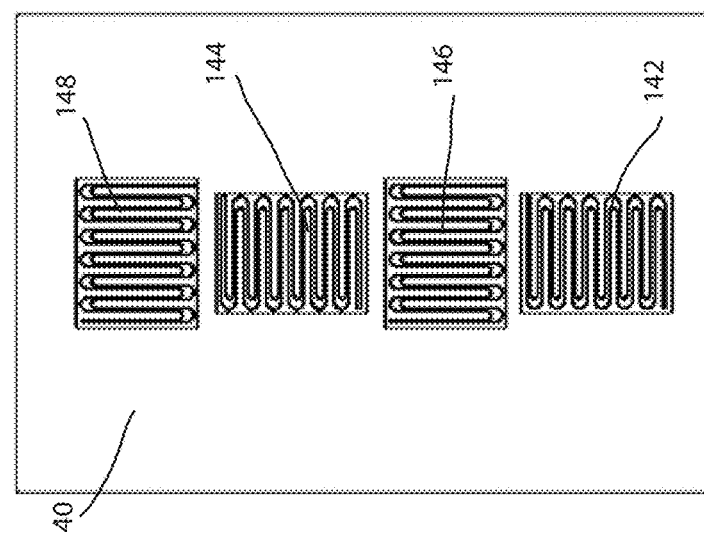
FIG. 2B depicts another strain gauge applicable to a surface of a pressure transducer in accordance with one embodiment.
Figure 2A:
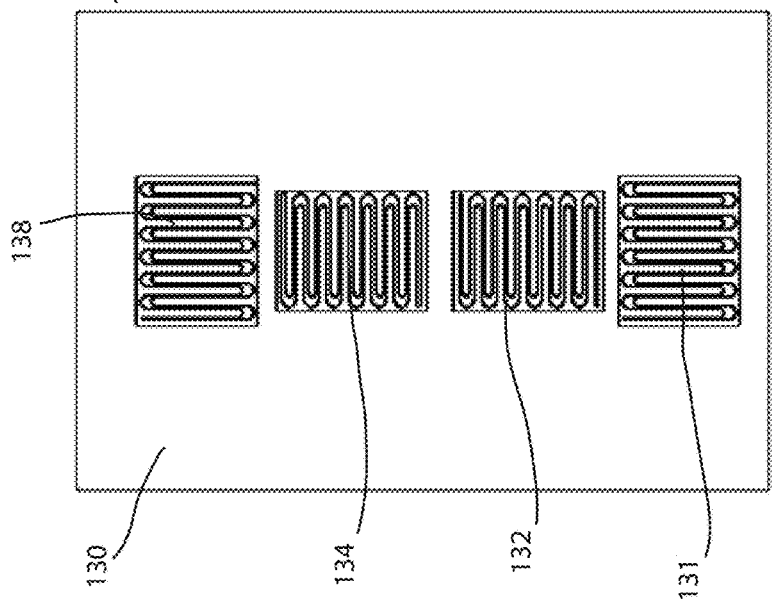
FIG. 2A depicts a strain gauge applicable to a surface of a pressure transducer in accordance with one embodiment.

FIGS. 2A-2C show various embodiments of active and balance grids positioned in other arrangements contemplated. The grids shown in these embodiments may have a mismatched coefficient of thermal expansion to the body upon which the grids are placed, like the embodiment described hereinabove with respect to FIGS. 1A-1C. FIGS. 2A-2C show embodiments contemplated are not limited by any particular position or orientation of the grids. In the embodiment shown in FIG. 2A, a surface 130 is shown having a first active grid 132, a second active grid 134, a first balance grid 136 and a second balance grid 138 of a strain gauge. The active grids 132, 134, and the balance grids 136, 138 may include the same features as the active grids 114, 116 and the balance grids 118, 120 shown in FIGS. 1A-1C. However, the grids 132, 134, 136, 138 may be oriented in a different arrangement than the grids 114, 116, 118, 120. It should be understood that the surface 130 may be a surface of an in-line pressure transducer such as the surface 112 of pressure transducer 100. However, the surface 130 may be a longer surface than the surface 112 in order to accommodate the in-line grids 114, 116, 118, 120 of the strain gauge. In the embodiment shown in FIG. 2A, the two active grids 132, 134 may be located between the two balance grids 136, 138 in-line. As shown, the active grids 132, 134 may have a grid alignment with wire lengths that extend horizontally and connecting curves extending vertically, while the balance grids 136, 138 may have a grid alignment with wire lengths that extends vertically and connecting curves that extend horizontally. In this manner, the active grids 132, 134 and the balance grids 136, 138 may be oriented orthogonally relative to each other.

As shown in FIG. 2B, a surface 140 is shown having a first active grid 142, a second active grid 144, a first balance grid 146 and a second balance grid 148 of a strain gauge. The active grids 142, 144, and the balance grids 146, 148 may include the same features as the active grids 114, 116 and the balance grids 118, 120 shown in FIGS. 1A-1C. The surface 140 may include the same features as the surface 130 shown in FIG. 2A. In the embodiment shown in FIG. 2B, the first active grid 142 may be placed in a bottom position, followed the first balance grid 146, followed next by the second active grid 144 and finally by the second balance grid 148 on top, all oriented in-line. Like the embodiment in FIG. 2A, the active grids 142, 144 may be oriented orthogonally relative to the balance grids 146, 148.

As shown in FIG. 2C, a surface 150 is shown having a first active grid 152, a second active grid 154, a first balance grid 156 and a second balance grid 158 of a strain gauge. The active grids 152, 154, and the balance grids 156, 158 may include the same features as the active grids 114, 116 and the balance grids 118, 120 shown in FIGS. 1A-1C. The surface 150 may include the same features as the surface 130 shown in FIG. 2A. In the embodiment shown in FIG. 2C, the first active grid 152 may be placed in a bottom position, followed the first balance grid 156, followed next by the second balance grid 158 and finally by the second active grid 154 on top, all oriented in-line. Like the embodiment in FIG. 2A, the active grids 152, 154 may be oriented orthogonally relative to the balance grids 156, 158.

Figure 3:
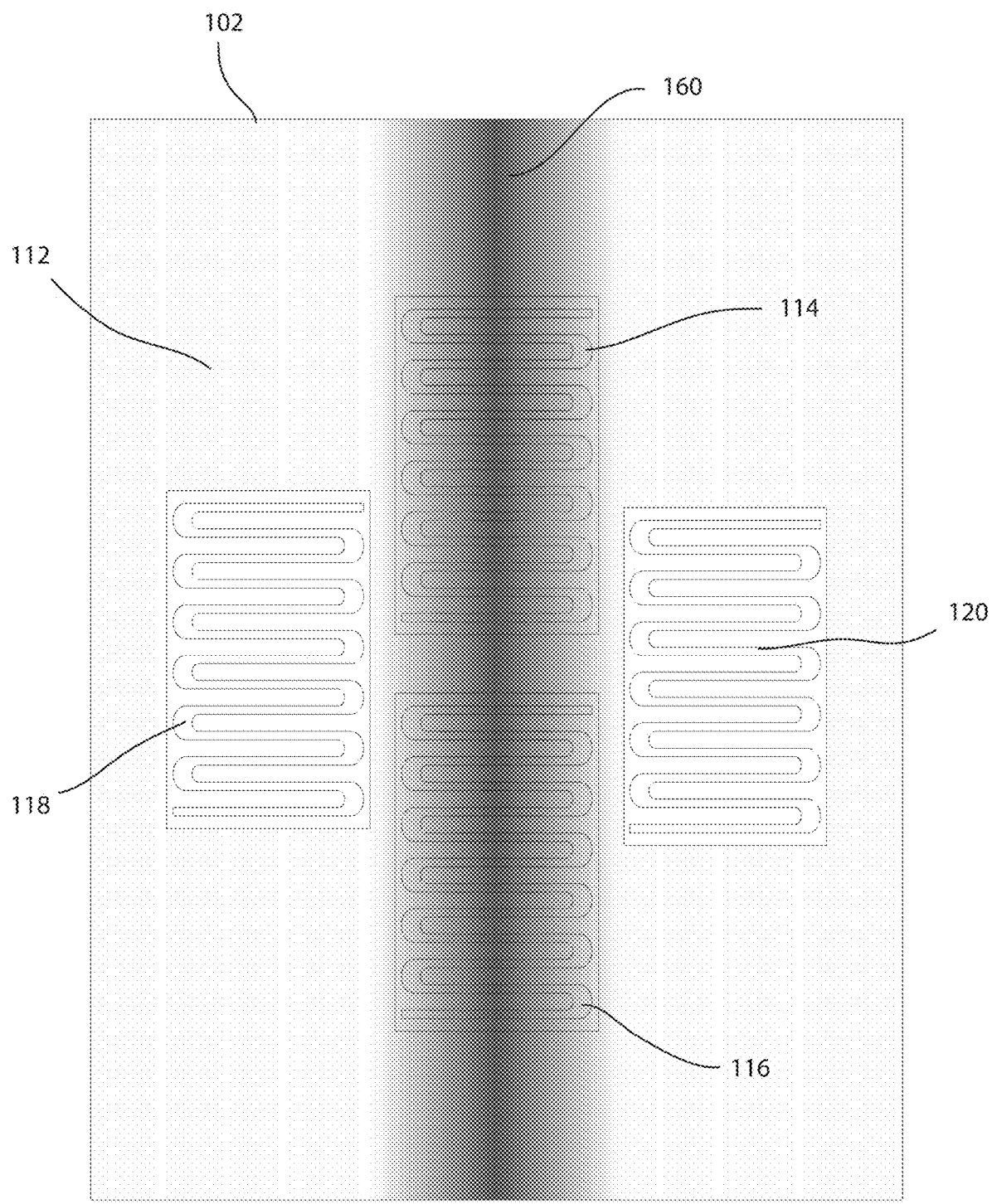
FIG. 3 depicts a surface of a pressure transducer having a strain gauge being subject to an adiabatic process in accordance with one embodiment.

Referring now to FIG. 3, the surface 112 of the pressure transducer 100 is shown. A darkened region 160 on the surface 112 in this Figure represents the strain of the surface due to an adiabatic event such adiabatic heating or cooling caused by a rapid change in pressure within the thermal chamber or fluid path 108. Thus, the active grids 114, 116 may be placed in a compressive state as a result of the body 102 compressing from the adiabatic event or thermal wave. This compression has not impinged upon the balance grids 118, 120. Instead, the pulling to the center by the body 102 may actually create a state of expansion at the location of the body 102 located under the balance grids 118, 120. As the thermal wave spreads outward (not shown), the wave amplitude may dissipate and the contractive strain may be radially toward the outer edges on the left and right of the surface 112. As the thermal wave dissipates, the grids begin to return to their normal, isothermal state. In the event that the coefficient of thermal expansion is greater in the grids 114, 116, 118, 120 than the body 102, when the body 102 contracts due to an adiabatic thermal event, the grids 114, 116, 118, 120 would contract more. Since the grids 114, 116, 118, 120 are bonded to the surface 112 of the body 102 and thereby constrained with the thin carrier backing 124, the grids 114, 116, 118, 120 cannot contract as much as they would in a free non-bonded state. The result is an actual strain measured by the strain gauge 110 increasing despite the contraction naturally caused by the adiabatic event's thermal wave. Depending on the amount of the mismatch, it is even possible to have a contracting thermal event result in a positive output voltage, despite the body 102 experiencing a contraction causing adiabatic event. With a smaller mismatch, the output voltage of the strain gauge 110 may be less negative and/or may have a smaller peak.

Figure 4:
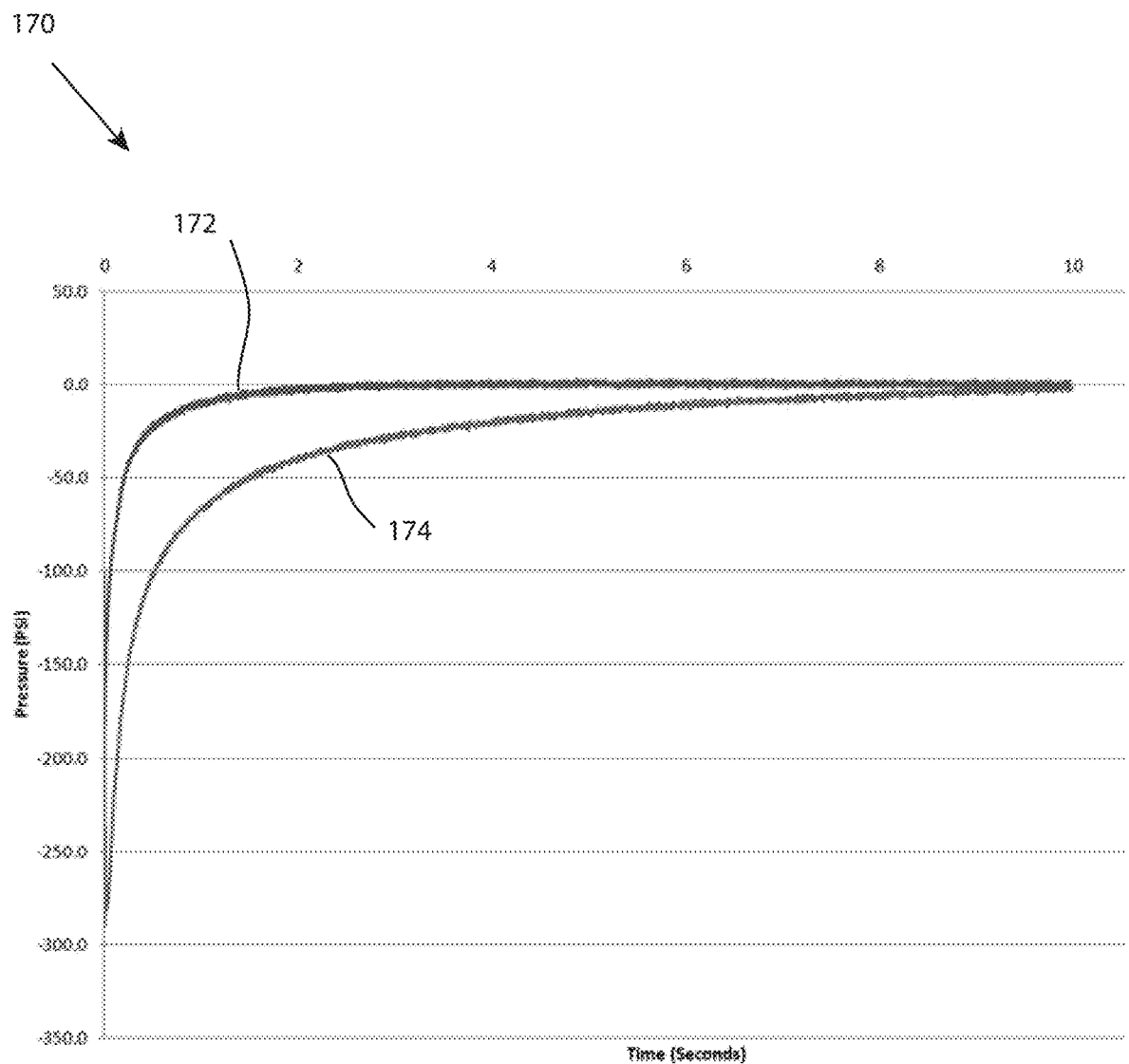
FIG. 4 depicts a graph of a pressure transducer having a strain gauge with a well matched coefficient of thermal expansion compared with the pressure transducer having a strain gauge with a mis-matched coefficient of thermal expansion in accordance with one embodiment.

Referring now to FIG. 4, a graph 170 of the pressure transducer 100 is shown having the strain gauge 110 with a mismatched coefficient of thermal expansion between the body 102 and the grids 114, 116, 118, 120 compared to a pressure transducer having the same properties as the pressure transducer 100 except having well-matched coefficients of thermal expansion between the body and the grids. The graph 170 plots pressure output of the strain gauges along the y-axis vs. settling time on the x-axis. In particular, in the plot 172 of the mismatched pressure transducer 100, the strain gauge pressure output returns to zero after only two seconds. In contrast, the plot 174 of the well-matched pressure transducer returns to zero after ten seconds. This long settling time can be undesirable in industries and applications where pressure must be detected immediately and adiabatic thermal events are common.

Figure 5:
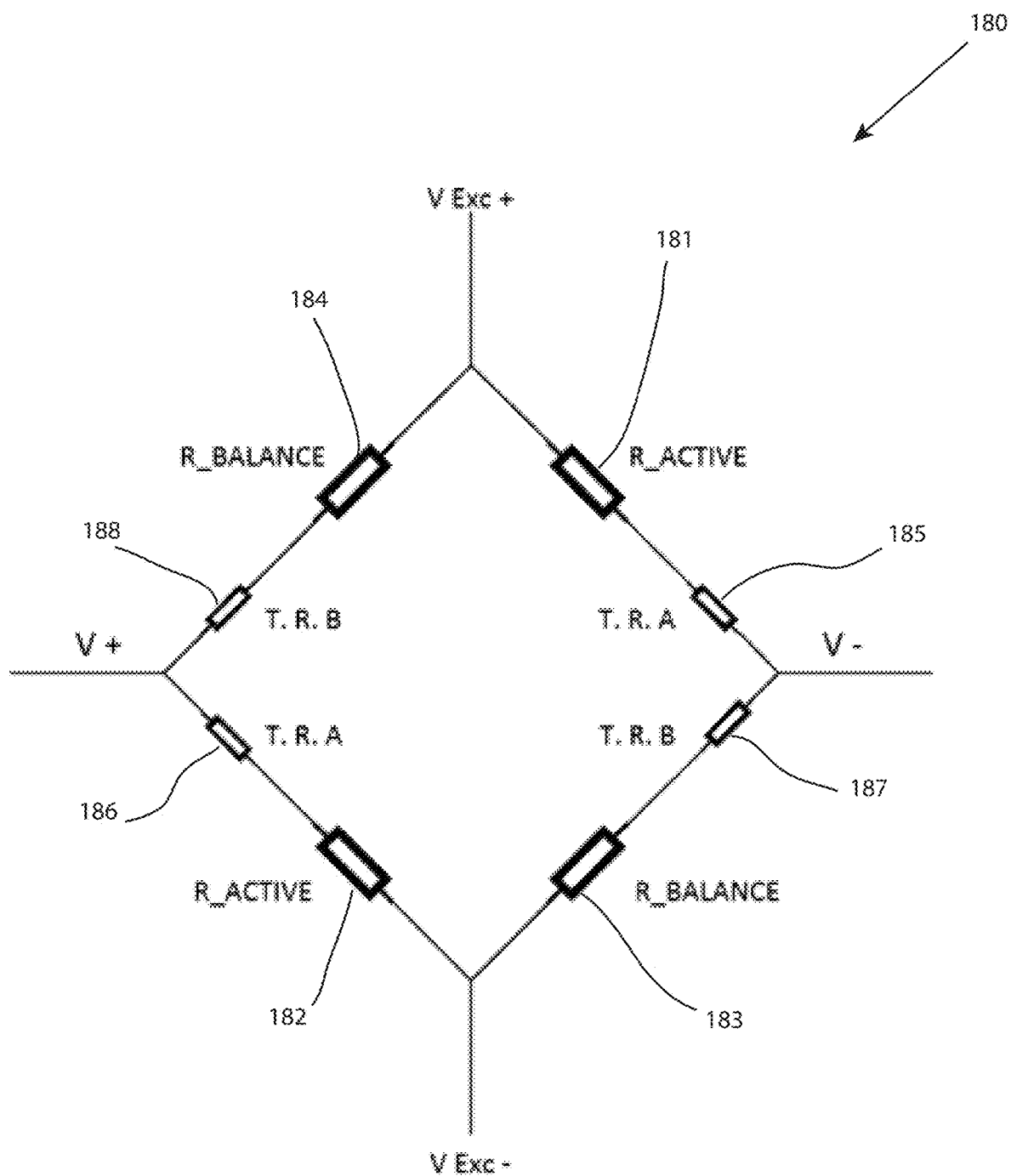
FIG. 5 depicts an electrical schematic of a strain gauge of a pressure transducer in accordance with one embodiment.

Referring now to FIG. 5, an electrical schematic of a strain gauge 180 of a pressure transducer such as the pressure transducer 100 in accordance with one embodiment. The strain gauge 180 may be similar to the strain gauge 110 and may include two active grids 181, 182 and two balance grids 183, 184. However, unlike the strain gauge 110, the strain gauge 180 may include additional thermal resistors 185, 186, 187, 188. Rather than the grids 181, 182, 183, 184 being the resistive element having a mismatched coefficient of thermal expansion relative to the thermal expansion of the body, the additional thermal resistors 185, 186, 187, 188 may be the resistive element having mismatched coefficients of thermal resistance relative to the body upon which they are attached. In other embodiments, both the grids 181, 182, 183, 184 and the additional thermal resistors 185, 186, 187, 188 may include mismatched coefficients of thermal resistance relative to the body. The additional thermal resistors 185, 186, 187, 188 may be low impedance and/or low resistance circuit elements. The thermal resistors 185, 186, 187, 188 may each be connected in series to respective active and balance grids 181, 182, 183, 184, as shown. In the embodiment shown, the thermal resistors 185, 186 proximate the active grids 181, 182 may have the same coefficient of thermal expansion as the thermal resistors 187, 188 proximate the balance grids 183, 184 but may have different resistances. In other embodiments, each of the thermal resistors 185, 186, 187, 188 may have the same resistance and coefficients of thermal resistance. In other embodiments, each of the thermal resistors 185, 186, 187, 188 may have the same resistance and different coefficients of thermal resistance. In other embodiments, each of the thermal resistors 185, 186, 187, 188 may have the different resistance and different coefficients of thermal resistance.

Figure 6:
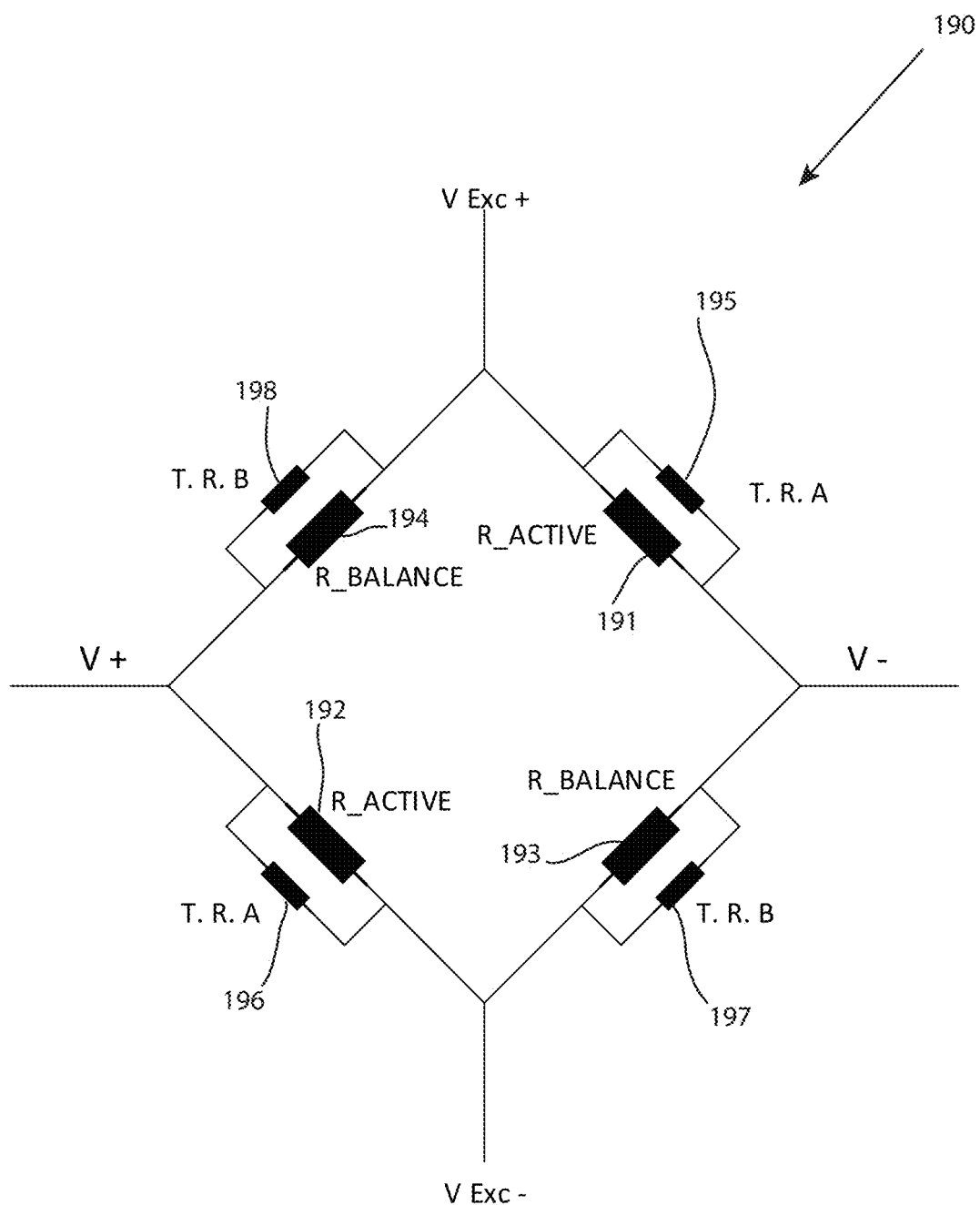
FIG. 6 depicts an electrical schematic of another strain gauge of a pressure transducer in accordance with one embodiment.

Referring to FIG. 6, an electrical schematic of a strain gauge 190 of a pressure transducer such as the pressure transducer 100 in accordance with one embodiment. The strain gauge 190 may be similar to the strain gauge 110 and may include two active grids 191, 192 and two balance grids 193, 194. However, unlike the strain gauge 110 but like the strain gauge 180, the strain gauge 190 may include additional thermal resistors 195, 196, 197, 198. Rather than the grids 191, 192, 193, 194 being the resistive element having a mismatched coefficient of thermal expansion relative to the body, the additional thermal resistors 195, 196, 197, 198 may be the resistive elements having mismatched coefficients of thermal resistance relative to the body upon which they are attached. In other embodiments, both the grids 191, 192, 193, 194 and the additional thermal resistors 195, 196, 197, 198 may include mismatched coefficients of thermal resistance relative to the body. The additional thermal resistors 195, 196, 197, 198 may be high impedance and/or resistance circuit elements, particularly compared with the thermal resistors 185, 186, 187, 188 connected in series described hereinabove with respect to the strain gauge 180. The thermal resistors 195, 196, 197, 198 may each be connected in parallel to respective active and balance grids 191, 192, 193, 194, as shown. In the embodiment shown, the thermal resistors 195, 196 connected in parallel with the active grids 191, 192 may have the same coefficient of thermal resistance as the thermal resistors 197, 198 connected in parallel to the balance grids 193, 194 but may have different resistances. In other embodiments, each of the thermal resistors 195, 196, 197, 198 may have the same resistance and different coefficients of thermal expansion. In other embodiments, each of the thermal resistors 195, 196, 197, 198 may have the same resistance and different coefficients of thermal resistance. In other embodiments, each of the thermal resistors 195, 196, 197, 198 may have the different resistance and different coefficients of thermal resistance.

While the embodiments depicted in the figures include only in-line pressure transducers, other embodiments are contemplated utilizing mismatched resistive elements on a strain gauge relative to a body for other types of pressure transducers including, for example, diaphragm style pressure transducers.

Methods of detecting pressure are also contemplated. For example, a method of detecting pressure may include providing a first pressure transducer such as the first pressure transducer 100 having a body such as the body 102 and a resistive element such as one or more of the resistive elements 122 attached to the body. The method may include mismatching a first coefficient of thermal expansion of the body to a second coefficient of thermal expansion of the resistive element. The method may include detecting pressure of a fluid system with the first pressure transducer. The method may include detecting pressure with the pressure transducer during an adiabatic thermal pulse. The method may further include reducing settling time after the adiabatic thermal pulse by at least 50 percent relative to a second pressure transducer having the same properties as the first pressure transducer other than the second pressure transducer having well-matched coefficient of thermal expansions. The second coefficient of thermal expansion may be greater than the first coefficient of thermal expansion. The method may still further include outputting a positive output voltage during an adiabatic thermal pulse. The method may include compensating, with the mismatched first and second coefficient thermal expansions, for an adiabatic thermal pulse.

Figure 7A:
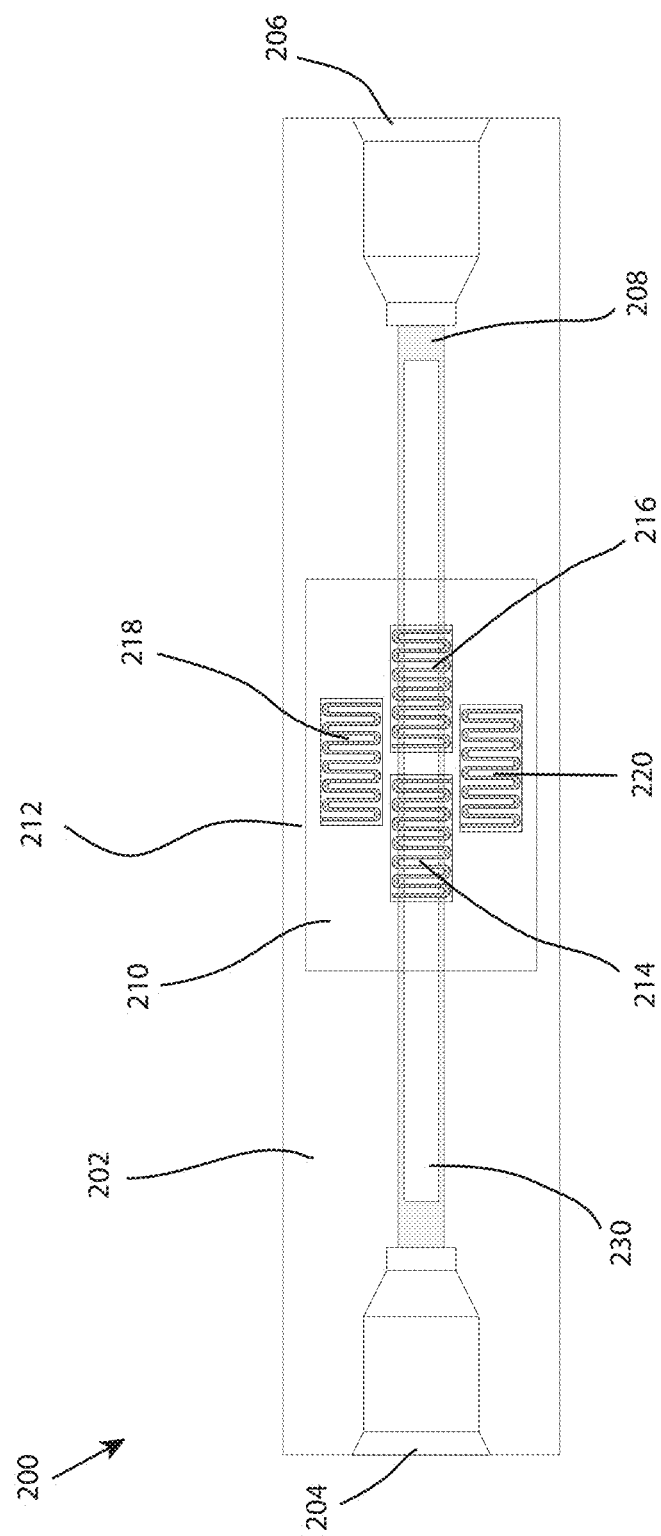
FIG. 7A depicts a top view of an in-line pressure transducer in accordance with one embodiment.

Referring now to FIG. 7A, a top view of an in-line pressure transducer 200 is shown in accordance with one embodiment. Similarly, FIG. 7B shows a side view of the pressure transducer 200 and FIG. 7C shows a cross sectional view of the pressure transducer 200 taken at arrows B-B. The pressure transducer 200 includes a body 202, a fluidic inlet 204, a fluidic outlet 206, and a fluidic cavity 208 extending between the fluidic inlet 204 and the fluidic outlet 206. The fluidic inlet 204 and the fluidic outlet 206 may include inner threads (not shown) configured to receive a connector, port, fitting or other coupling for connecting the in-line pressure transducer 200 to a fluidic system, such as a liquid chromatography system. While the embodiment shown includes both the fluidic inlet 204 and the fluidic outlet 206, other embodiments contemplated include single ended transducers including a single fluidic inlet that acts as both a fluidic inlet and a fluidic outlet. In this embodiment, the single fluidic inlet may be considered a fluidic interface port.

The fluidic cavity 208 is enclosed by the body 202. A strain gauge 210 is disposed on a surface 212 located on the outside of the body 202. The surface 212 may be a flat surface as shown. In other embodiments, the surface 212 may include one or more curves thereon. The strain gauge 210 includes a Wheatstone bridge having a first active grid 214 and a second active grid 216 located directly above the fluidic cavity 208 on the surface 212, along with a first balance grid 218 disposed above the fluidic cavity 208 on the surface 212 and a second balance grid 220 disposed below the fluidic cavity 208 on the surface 212. The orientation and position of the active and balance grids 214, 216, 218, 220 shown is exemplary and various other orientations are positions are contemplated.

The fluidic cavity 208 may be considered a fluidic path or other fluidic body configured to receive pressurized fluid. The strain gauge 210 may be configured to detect the pressure in the fluidic cavity 208 or cavity by measuring the strain caused by the pressurized fluid on the body 202. The surface 212 may be a removed portion that is removed from the body 202. In other embodiments, the surface 212 may be molded or otherwise integrated into the body 202. As shown in FIGS. 2B and 2C, the surface 212 is located closer to the fluidic cavity 208 than the rest of the outer circumference of the body 202.

Within the fluidic cavity 208 is shown a filler body 230. The filler body 230 may extend a substantial length of the fluidic cavity 208, as shown in FIGS. 7A and 7B. The filler body 230 may extend almost the entire length of the fluidic cavity 208. In other embodiments, the filler body 320 may be located only at the location located directly below the strain gauge 210 and/or surface 212.

The filler body 230 may be located within the fluidic cavity or fluidic cavity 208 and may be configured to reduce adiabatic thermal effects on the body 202 of the pressure transducer 200. The filler body 230 may reduce the volume within the fluidic cavity 208. As shown in FIG. 7C, the filler body 230 may further be configured to reduce the cross sectional area of the fluidic cavity or fluidic cavity 208 to a reduced cross sectional area 232. The reduced cross sectional area 232 may be a greater or larger area than the smallest cross sectional area at the fluidic inlet 204 and/or the fluidic outlet 206 after the fluidic inlet 204 and fluidic outlet 206 has been connected in line to a fluidic system as described herein above. In other embodiments, the reduced cross sectional area 232 may be an equal cross sectional area to the smallest cross sectional area at the fluidic inlet 204 and/or the fluidic outlet 206 after the fluidic inlet 204 and fluidic outlet 206 has been connected in line to a fluidic system as described herein above. Whatever the embodiment, the reduced cross sectional area 232 may not be a limiting dimension for reducing the volume of fluid flow through a fluidic system.

In one embodiment, the filler body 230 may include the same material as the body 202 of the pressure transducer 200. In other embodiments, the filler body 230 may be made of a material that is different than the material of the body 202. The filler body 230 and the body 202 may be made of a metallic material such as, for example, zinc, stainless steel, titanium, Invar, or aluminum. In other embodiments, the body 202 may be a metallic material but the filler body 230 may be made of a non-metallic material such as a plastic, a composite or synthetic. The filler body 230 may be a separate component from the shape of the fluidic cavity 208 that is disposed within the fluidic cavity 208 during fabrication of the pressure transducer 200. Disposing the filler body 230 within the fluidic cavity 208 may include welding or otherwise attaching the filler body into the fluidic cavity 208. In other embodiments, the filler body 230 may simply be the integral shape of the fluidic cavity 208.

As shown in FIG. 7C, the filler body 230 may have a cylindrical shape. The cylindrical body or shape of the filler body 230 may have a diameter less than the diameter of the fluidic cavity 208. The filler body 230 is shown located at a location within the fluidic cavity or fluidic cavity 208 that is distal to the strain gauge 210. In particular, the filler body 230 is located at a bottom of the fluidic cavity 208. Thus, the filler body 230 may not contact a sensing region 231 of the inner surface of the fluidic cavity 208 that is located directly below the strain gauge 210. The sensing region may include the upper half of the inner surface of the fluidic cavity 208. This may allow the fluid to flow closely to the web thickness so that the pressure transducer 200 can more easily detect pressure within the fluidic cavity 208. The filler body 230 may be a solid cylinder as shown. A fluid path space 232 is located above the filler body 230 between the filler body 230 and the circumference of the fluidic cavity 208.

While the filler body 230 of FIGS. 7A-7C is a solid cylinder located within the fluidic cavity 208, other shaped filler bodies are contemplated, as shown in FIGS. 8A-8F. While several shapes shown in FIGS. 8A-8F, the invention is not limited to these shapes.

FIG. 8A depicts a cross sectional view of an in-line pressure transducer 240 at a midpoint along its length. The pressure transducer 240 includes a strain gauge 242, and a fluidic cavity or path 244. The pressure transducer further includes a filler body 246 disposed within the fluidic cavity or path 244 configured to reduce the fluid volume found within the fluidic cavity or path 244 at any given time. A first fluid path space 248 may be located outside the filler body 246 and a second fluid path space 249 may be located within the filler body 246. In this embodiment, the filler body 246 may have a hollow cylindrical shape. In other words, the filler body 246 may be a tubular body having a diameter less than the diameter of the fluidic cavity or path 244 and may be located in the middle of the fluidic cavity or path 244. The filler body 246 may be disposed within the fluidic cavity or path 244 in a loose or unattached manner. In other embodiments, the filler body 246 may be attached to the fluidic cavity or path 244 with an extending portion (not shown) that extends between the filler body 246 and fluidic cavity 244 and holds the filler body 246 into the place shown.

FIG. 8B depicts a cross sectional view of an in-line pressure transducer 250 at a midpoint along its length. The pressure transducer 250 includes a strain gauge 252, and a fluidic cavity or path 254. The pressure transducer further includes a filler body 256 disposed within the fluidic cavity or path 254 configured to reduce the fluid volume found within the fluidic cavity or path 254 at any given time. A fluid path space 258 may be located outside the filler body 246. In this embodiment, the filler body 256 may have a solid cylindrical shape larger than the filler body 230 described hereinabove. The filler body 256 may be disposed within the fluidic cavity or path 256 at the bottom of the fluidic cavity or path 254 in a similar manner to the filler body 230.

FIG. 8C depicts a cross sectional view of an in-line pressure transducer 260 at a midpoint along its length. The pressure transducer 260 includes a strain gauge 262, and a fluidic cavity or path 264. The pressure transducer further includes a filler body 266 disposed within the fluidic cavity or path 264 configured to reduce the fluid volume found within the fluidic cavity or path 264 at any given time. A fluid path space 268 may be located above the filler body 266. The filler body 266 may have a cylindrical shape with a flat removed portion disposed along the length of the cylinder at a circumferential location proximate the strain gauge 262 when the filler body 266 is attached to the fluidic cavity 264. The filler body 266 may be attached to the fluidic cavity or path 264. The filler body 266 may have a substantially similar outer circumference than the circumference of the fluidic cavity or path 264, with the exception of the removed portion.

FIG. 8D depicts a cross sectional view of an in-line pressure transducer 270 at a midpoint along its length. The pressure transducer 270 includes a strain gauge 272, and a fluidic cavity or path 274. The pressure transducer further includes a filler body 276 disposed within the fluidic cavity or path 274 configured to reduce the fluid volume found within the fluidic cavity or path 274 at any given time. A first fluid path space 278 may be located above the filler body 276 and a second fluid path space 279 may be located below the filler body 276. In this embodiment, the filler body 276 may be a flat bar extending across the cross sectional area of the fluidic cavity or path 274 having curved edges. The curved edges may correspond dimensionally to the circumference of the fluidic cavity or path 274. The filler body 276 may be attached to the fluidic cavity or path 274 at the curved edges.

FIG. 8E depicts a cross sectional view of an in-line pressure transducer 280 at a midpoint along its length. The pressure transducer 280 includes a strain gauge 282, and a fluidic cavity or path 284. The pressure transducer further includes a filler body 286 disposed within the fluidic cavity or path 284 configured to reduce the fluid volume found within the fluidic cavity or path 284 at any given time. The filler body 286 may be "X" shaped and may be attached to the fluidic cavity or path 284 at the extensions of the X. A first fluid path space 285 may be located above the filler body 286, a second fluid path space 287 may be located to the right side of the filler body 286, a third fluid path space 288 may be located below the filler body 286 and a fourth fluid path space 289 may be located to the left side of the filler body 286.

FIG. 8F depicts a cross sectional view of an in-line pressure transducer 290 at a midpoint along its length. The pressure transducer 290 includes a strain gauge 292, and a fluidic cavity or path 294. The pressure transducer further includes a filler body 296 disposed within the fluidic cavity or path 294 configured to reduce the fluid volume found within the fluidic cavity or path 294 at any given time. The filler body 296 may have a square shaped cross section with rounded or chamfered outer edges and may be attached to the fluidic cavity or path 294 at the rounded outer edges. A first fluid path space 295 may be located above the filler body 296, a second fluid path space 297 may be located to the right side of the filler body 296, a third fluid path space 298 may be located below the filler body 296 and a fourth fluid path space 299 may be located to the left side of the filler body 296.

Figure 9A:
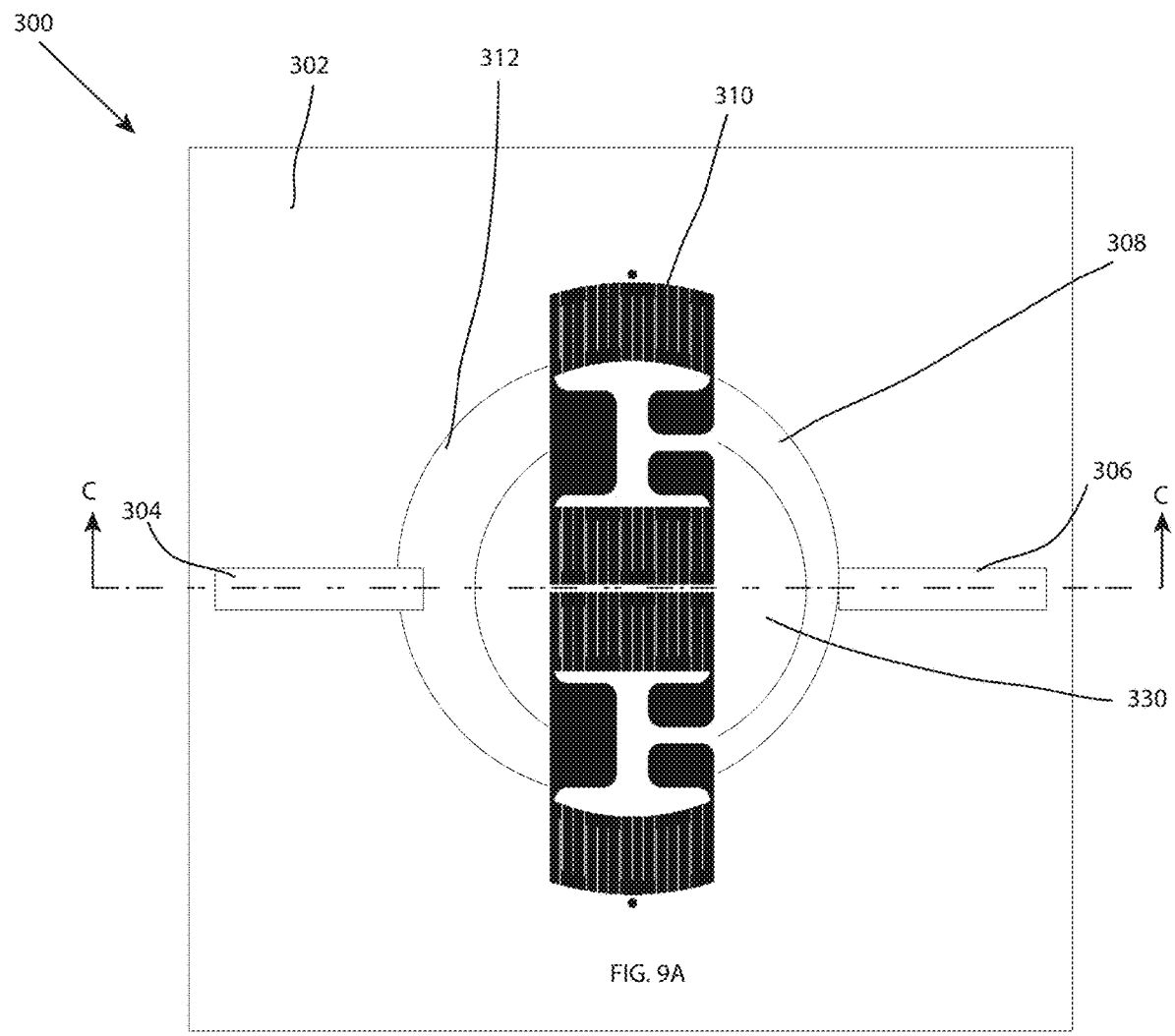
FIG. 9A depicts a top view of a diaphragm pressure transducer in accordance with one embodiment.
Figure 9B:
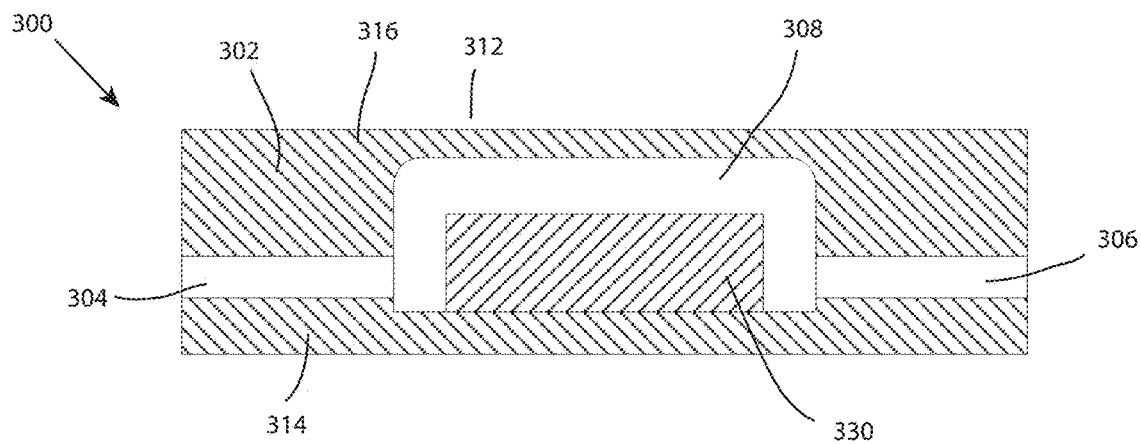
FIG. 9B depicts a cutaway view of the pressure transducer of FIG. 8A taken at arrows C-C in accordance with one embodiment.

FIG. 9A depicts a top view of a diaphragm pressure transducer 300 in accordance with one embodiment while FIG. 9B depicts a cutaway view of the pressure transducer of FIG. 8A taken at arrows C-C. The diaphragm pressure transducer 300 includes a body 302, a fluidic inlet 304, a fluidic outlet 306, and a fluidic cavity 308 located between the fluidic inlet 304 and the fluidic outlet 306 and enclosed by the body 202. While the embodiment shown includes both the fluidic inlet 304 and the fluidic outlet 306, other embodiments contemplated include single ended transducers including a single fluidic inlet that acts as both a fluidic inlet and a fluidic outlet. In this embodiment, the single fluidic inlet may be considered a fluidic interface port.

A strain gauge 310 is disposed on a diaphragm surface 312 located on the outside of the body 302 of the diaphragm pressure transducer 300. The strain gauge 310 includes a Wheatstone bridge having grids as described hereinabove. The strain gauge 310 may be configured to detect the pressure in the fluidic cavity 308 by measuring the strain caused by the pressurized fluid on the body 302 or diaphragm surface 312. The diaphragm surface 312 may be a surface located above the fluidic cavity 308.

Within the fluidic cavity 308 is shown a filler body 330. Like the filer bodies described hereinabove, the filler body 330 may be located within the fluidic cavity 308 and may be configured to reduce adiabatic thermal effects on the body 302 of the pressure transducer 300. The filler body 330 may reduce the volume within the fluidic cavity 308. As shown in FIG. 9B, the filler body 330 may further be configured to reduce the cross sectional area of the fluidic cavity 308. The reduced cross sectional area of the cavity 308 may be a greater or larger area than the smallest cross sectional area at the fluidic inlet 304 and/or the fluidic outlet 306. In other embodiments, the reduced cross sectional area may be an equal cross sectional area to the smallest cross sectional area at the fluidic inlet 304 and/or the fluidic outlet 306. Whatever the embodiment, the reduced cross sectional area may not be a limiting dimension for reducing the volume of fluid flow through a fluidic system.

The filler body 330 and the body 302 of the diaphragm pressure transducer 300 may be made of the same materials as those described hereinabove with respect to the filler body 230 and the body 202 of the in-line pressure transducer 200. In creating or fabricating the diaphragm pressure transducer 300, a lower body portion 314 of the body 302 and an upper body portion 316 of the body 302 may be joined, welded or otherwise attached after the filler body 330 has been disposed, attached, or otherwise included into the cavity 308. In other embodiments, the filler body 330 may simply be the integral shape of the fluidic cavity 308.

Figure 10:
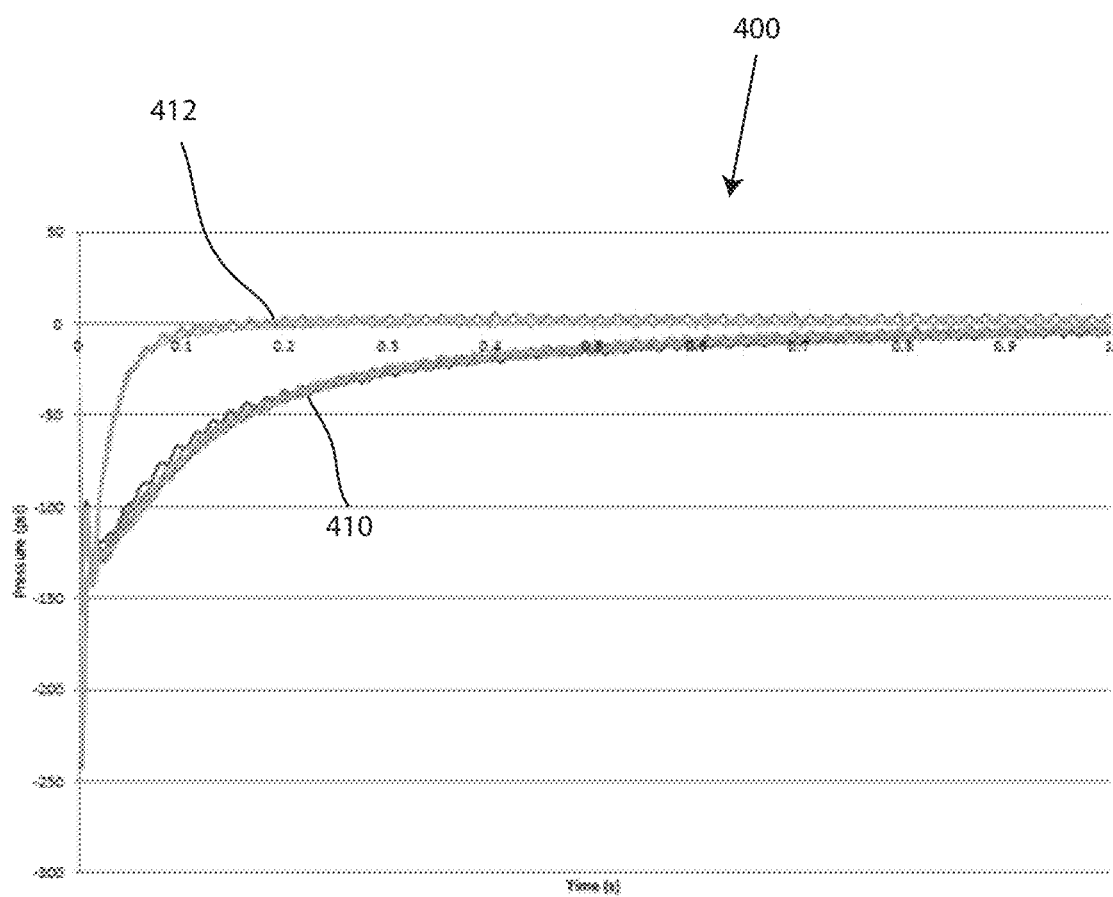
FIG. 10 depicts a graph of a pressure transducer having no filler body compared with the pressure transducer having a filler body in accordance with one embodiment.

FIG. 10 depicts a graph 400 of the pressure transducer 200 is shown having the filler body 230 disposed or otherwise included in the fluidic cavity or path 208 compared to a pressure transducer having the same properties as the pressure transducer 200 except having no filler body located with the fluidic cavity or path. The graph 400 plots pressure output of the strain gauges along the y-axis vs. settling time on the x-axis. In particular, the plot 412 shows the pressure transducer 200 including the filler body 230, the strain gauge pressure output returns to zero after only 0.15 seconds. In contrast, the plot 410 of the pressure transducer without the filler body returns to zero after one full second. This long response time can be undesirable in industries and applications where pressure must be detected immediately and adiabatic thermal events are common.

Further methods of fabricating a pressure transducer and/or detecting pressure are also contemplated. In one embodiment, a method includes providing a pressure transducer such as one of the pressure transducers 200, 300, having a fluidic inlet such as one of the fluid inlets 204, 304, a fluidic outlet such as one of the fluid outs 206, 306, and a fluidic cavity located between the fluidic inlet and the fluidic outlet enclosed by the transducer body such as one of the fluidic cavities 208, 308. The method may include attaching a strain gauge to the transducer body such as one of the strain gauges 210, 310. The method may include integrating a filler body within the fluidic cavity, such as one of the filler bodies 230, 246, 256, 266, 276, 286, 296, 330. The method may include reducing a volume of the fluidic cavity with the filler body. Further, the method may include reducing adiabatic thermal effects on the transducer body with the filler body relative to a second pressure transducer having the same properties as the pressure transducer other than the second pressure transducer being fabricated without the filler body. The method may further include reducing the cavity cross sectional area to a reduced cross sectional area along a length of the cavity with the filler body. The reduced cross sectional area may be greater than or equal to an inlet cross sectional area at the fluidic inlet. The method may include not contacting a sensing region of an inner surface of the fluidic cavity with the filler body, the sensing region, such as the sensing region 231, located directly below the strain gauge within the filler cavity.

Figure 11:
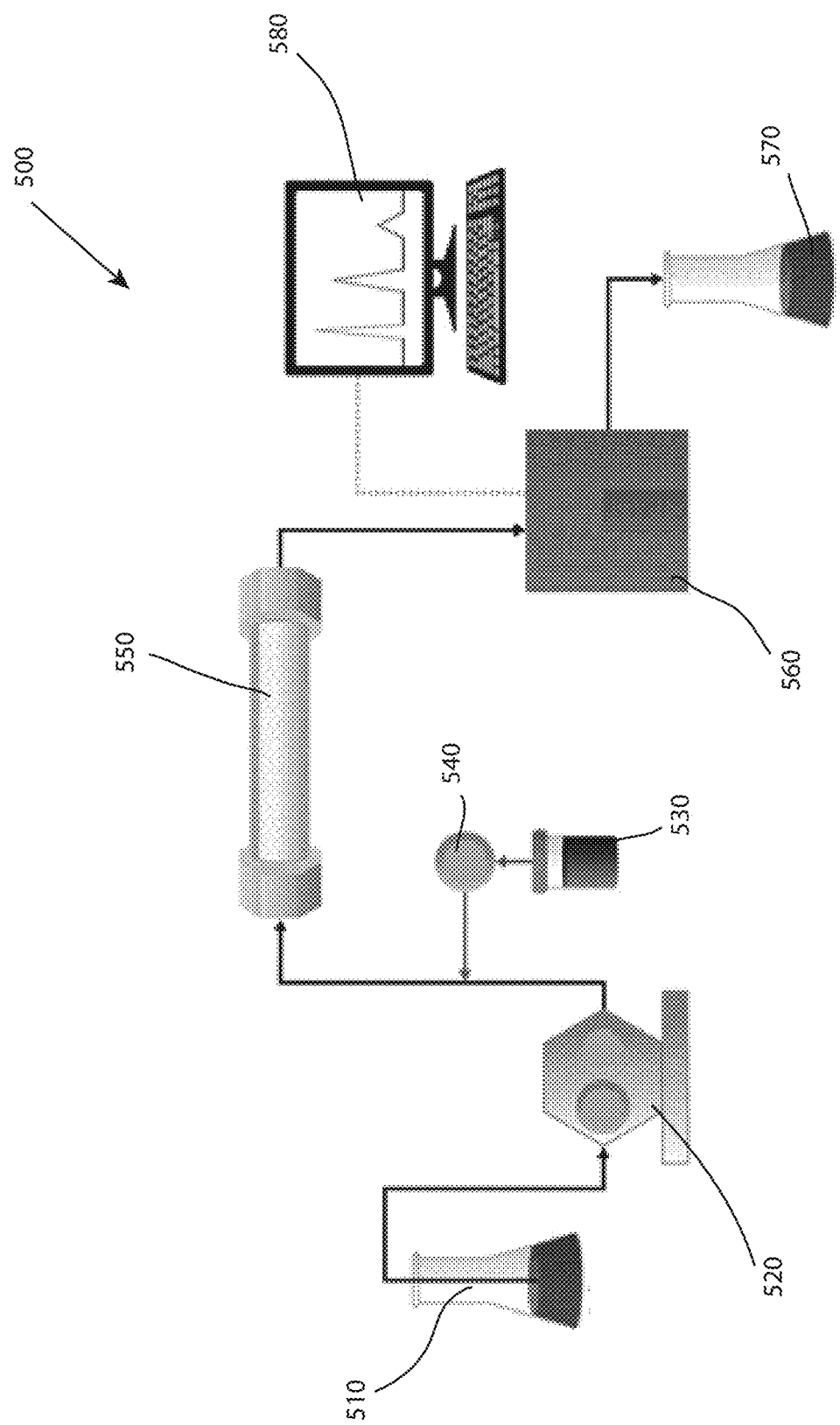
FIG. 11 depicts a schematic of a liquid chromatography system in accordance with one embodiment.

FIG. 11 depicts a schematic of a liquid chromatography system 500 in accordance with one embodiment. The liquid chromatography system 500 may include various features such as a solvent or mobile phase reservoir 510, a pump, solvent manager or other solvent delivery system 520, a sample container 530 with a sample injector or sample manager 540, a liquid chromatography column 550, a detector 560, a waste reservoir or system 570 and a control or computer system or other chromatogram 580. The liquid chromatography system 500 may be a fluidic system configured to provide a mixed liquid comprising both the solvent 510 and the sample 530 to the separation column 550 for separation and analysis by the detector. The liquid chromatography system 500 may be a high performance liquid chromatography system, a gas chromatography system, or the like. One or more of the pressure transducers described herein may be included in the liquid chromatography system 500 to detect fluid pressure and/or provide system control and/or system feedback. In one embodiment, one or more of the pressure transducers described herein may be included in the liquid chromatography system 500 before, after and/or within the pump, solvent manager or solvent delivery system 520. Other locations in the system are also contemplated. Furthermore, other fluid systems besides liquid chromatography systems may incorporate pressure transducers consistent with embodiments described herein.

While the invention has been shown and described with reference to specific embodiments, it should be understood by those skilled in the art that various changes in form and detail may be made therein without departing from the spirit and scope of the invention as recited in the accompanying claims. For example, various embodiments of the micropipet are described as dispensing three or four aliquots, it should be recognized that in other embodiments the micropipet can be configured to deliver other numbers of aliquots from a single sample collection.

What is claimed is:

1. A pressure transducer comprising:
a transducer body having a fluidic inlet, and a fluidic cavity in fluidic communication with the fluidic inlet and enclosed by the transducer body;
a strain gauge attached to the transducer body; and
a filler body located in the fluidic cavity configured to reduce adiabatic thermal effects on the transducer body.

2. The pressure transducer of claim 1, wherein the filler body reduces the cross sectional area of the fluidic cavity to a reduced cross sectional area that is greater than or equal to an inlet cross sectional area at the fluidic inlet.

3. The pressure transducer of claim 1, wherein the filler body comprises the same material as the transducer body.

4. The pressure transducer of claim 1, wherein the filler body comprises a material that is different from a material of the transducer body.

5. The pressure transducer of claim 1, wherein the pressure transducer is a flow through pressure transducer.

6. The pressure transducer of claim 5, wherein the filler body is a cylindrical body having a diameter less than a diameter of the fluidic cavity and located in the fluidic cavity distal to the strain gauge.

7. The pressure transducer of claim 5, wherein the filler body is a tubular body having a diameter less than a diameter of the fluidic cavity and located in the middle of the fluidic cavity.

8. The pressure transducer of claim 5, wherein the filler body extends a substantial length of the fluidic cavity.

9. The pressure transducer of claim 1, wherein the pressure transducer is a dead-end pressure transducer.

10. The pressure transducer of claim 1, wherein the pressure transducer is a diaphragm pressure transducer.

11. The pressure transducer of claim 1, wherein the filler body does not contact a sensing region of an inner surface of the fluidic cavity, the sensing region located directly below the strain gauge within the filler cavity.

12. A method comprising:
providing a pressure transducer having a fluidic inlet, and a fluidic cavity in fluidic communication with the fluidic inlet and enclosed by the transducer body;
attaching a strain gauge to the transducer body;
integrating a filler body within the fluidic cavity; and
reducing a volume of the fluidic cavity with the filler body.

13. The method of claim 12, further comprising reducing adiabatic thermal effects on the transducer body with the filler body relative to a second pressure transducer having the same properties as the pressure transducer other than the second pressure transducer fabricated without the filler body.

14. The method of claim 12, wherein the pressure transducer is a flow through pressure transducer and wherein the filler body extends along a length of the fluidic cavity having a cavity cross sectional area, the method further comprising:
reducing the cavity cross sectional area to a reduced cross sectional area along the length with the filler body, wherein the reduced cross sectional area is greater than or equal to an inlet cross sectional area at the fluidic inlet.

15. The method of claim 12, wherein the integrating the filler body within the fluid cavity further comprises not contacting a sensing region of an inner surface of the fluidic cavity with the filler body, the sensing region located directly below the strain gauge within the filler cavity.

16. A liquid chromatography system comprising:
a solvent delivery system;
a sample delivery system in fluidic communication with the solvent delivery system;
a liquid chromatography column located downstream from the solvent delivery system and the sample delivery system;
a detector located downstream from the liquid chromatography column; and
the pressure transducer of claim 1.

17. The liquid chromatography system of claim 16, wherein the filler body reduces the cross sectional area of the fluidic cavity to a reduced cross sectional area that is greater than or equal to an inlet cross sectional area at the fluidic inlet.

18. The liquid chromatography system of claim 16, wherein the filler body comprises the same material as the transducer body.

19. The liquid chromatography system of claim 16, wherein the filler body comprises a material that is different from a material of the transducer body.

20. The liquid chromatography system of claim 16, wherein the pressure transducer is a flow through pressure transducer.

* * * * *